US008967930B2

(12) United States Patent
    Jespersen

(10) Patent No.: US 8,967,930 B2
(45) Date of Patent: Mar. 3, 2015

(54) TRANSPORT SYSTEM FOR LARGE ITEMS

(75) Inventor: Viggo Jespersen, Skaarup (DK)

(73) Assignee: Viggo Jespersen Holding APS, Skaarup (DK)

( * ) Notice: Subject to any disclaimer, the term of this patent is extended or adjusted under 35 U.S.C. 154(b) by 0 days.

(21) Appl. No.: 14/114,278

(22) PCT Filed: Feb. 1, 2012

(86) PCT No.: PCT/DK2012/000010
    § 371 (c)(1),
    (2), (4) Date: Nov. 21, 2013

(87) PCT Pub. No.: WO2012/146245
    PCT Pub. Date: Nov. 1, 2012

(65) Prior Publication Data
    US 2014/0072382 A1    Mar. 13, 2014

(30) Foreign Application Priority Data
    Apr. 28, 2011  (DK) ................................ 2011 00327

(51) Int. Cl.
    *B65D 85/68*    (2006.01)
    *B65D 90/00*    (2006.01)
    *F03D 1/00*     (2006.01)
(52) U.S. Cl.
    CPC .............. *B65D 85/68* (2013.01); *B65D 90/006* (2013.01); *B65D 2585/6897* (2013.01); *F03D 1/005* (2013.01); *F05B 2240/40* (2013.01); *Y02E 10/72* (2013.01); *B65D 90/00* (2013.01)
    USPC .......................................................... 410/44
(58) Field of Classification Search
    USPC ............. 410/44, 49, 47, 87, 117, 155, 32, 36, 410/39; 206/417, 446, 594; 248/633, 687
    See application file for complete search history.

(56) References Cited

U.S. PATENT DOCUMENTS 2,803,363 A * 8/1957 Hutchinson ................... 414/608
3,476,260 A * 11/1969 Jay ................................ 206/503
(Continued)

FOREIGN PATENT DOCUMENTS

CN    201619776    11/2010
DE    3245951      6/1984
(Continued)

OTHER PUBLICATIONS

Danish Search Report for PA 2011 00327, dated Dec. 20, 2011, 1 pg.
PCT International Preliminary Report on Patentability in PCT/DK2012/000010, dated Jul. 4, 2013, 14 pgs.
PCT International Search Report in PCT/DK2012/000010, dated Jun. 11, 2012, 5 pgs.

*Primary Examiner* — Glenn Dayoan
*Assistant Examiner* — Sunsurraye Westbrook
(74) *Attorney, Agent, or Firm* — Cermak Nakajima & McGowan; Adam J. Cermak

(57) ABSTRACT

A transport system for transporting large items wherein the large items comprise at least three through going holes and said system comprises a frame to support the items. Said frame has a substantially rectangular shape and comprises two parallel longitudinal beams connected by two parallel transverse beams and further comprises at least two transverse support bars to support the items, which transverse support bars are located between the two parallel transverse beams. The transport system further comprises a first and a second rod to be mounted in two through going holes in the items where each end of the first and second rod can be connected to the longitudinal beams to secure the items to the frame in such a way that no part of the large items extends over the rectangle defined by the two parallel longitudinal beams and the two parallel transverse beams.

11 Claims, 3 Drawing Sheets

(56) References Cited

U.S. PATENT DOCUMENTS

| | | | | |
|---|---|---|---|---|
| 3,715,993 | A | * | 2/1973 | Orlik ............................... 410/48 |
| 3,753,407 | A | * | 8/1973 | Tilseth ......................... 108/53.3 |
| 4,102,274 | A | * | 7/1978 | Feary et al. ..................... 410/50 |
| 4,195,732 | A | * | 4/1980 | Bell .............................. 206/391 |
| 5,080,314 | A | * | 1/1992 | Moyer et al. ............... 248/346.4 |
| 5,515,977 | A | * | 5/1996 | Lambert ....................... 206/597 |
| 5,931,435 | A | | 8/1999 | Hoadley et al. |
| 7,815,404 | B2 | * | 10/2010 | DeMent .......................... 410/49 |

FOREIGN PATENT DOCUMENTS

| | | |
|---|---|---|
| JP | S58-4870 | 1/1983 |
| JP | 2008013208 | 1/2008 |
| WO | WO-2008/013486 | 1/2008 |

* cited by examiner

TRANSPORT SYSTEM FOR LARGE ITEMS

CROSS REFERENCE TO RELATED APPLICATIONS

This application is the US National Stage entry of International Application No. PCT/DK2012/000010, filed Feb. 1, 2012, which claims priority to Danish Patent Application No. PA 2011 00327, filed Apr. 28, 2011, the disclosures of which are incorporated herein by reference in their entirety.

FIELD OF THE INVENTION

The present invention relates to a transport system for transporting large items, in particular flanges for wind turbine plants.

BACKGROUND OF THE INVENTION

Chinese patent document CN 201619776 U discloses a transport packing device for pivoting support. The device has a lower base provided with four longitudinal beams mounted on three transverse beams at regular intervals and two upper beams which can be connected with the lower beams by bolts and nuts and hold the package there between. The transport packing device has, however, limited capacity in respect of the size of the package that can be transported.

Within industries that produce machines and power plants, which comprises large items it is frequently necessary to transport those large items. When large items are transported they are normally transported in a manner so their longest extension which may be up to several meters, is in a substantially horizontal position. However, the large item may occupy many square meters, when they are transported in this manner and this may be very costly in particular when the large items are transported by ship. The large items may occupy an area that corresponds to several standard containers which significantly increases the cost of transport and handling for these items.

However, until now there have been no alternatives to the customary way of transporting large items on ships and the higher costs for transportation has hitherto been accepted as an unavoidable disadvantage.

Consequently, one object of the present invention is to provide a system that reduces the cost for transportation of large items, in particular the costs related to sea transport.

Moreover, the present invention provides an alternative transport system to those systems presently in use.

SUMMARY OF THE INVENTION

Thus, the present invention relates to a transport system for transporting large items, wherein the large items comprise at least three through going holes and said system comprises a frame to support the items said frame has a substantially rectangular shape and comprises two parallel longitudinal beams connected by two parallel transverse beams and further comprises at least two transverse support bars to support the items which transverse support bars are located between the two parallel transverse beams, wherein the transport system further comprises a first and a second rod to be mounted in two through going holes in the items where each end of the first and second rod can be connected to the longitudinal beams to secure the items to the frame in such a way that the no parts of the large items extends over the rectangle defined by the two parallel longitudinal beams and the two parallel transverse beams.

Thus, the rectangle defined by the two parallel longitudinal beams and the two parallel transverse beams forming the frame also defines the border of the transport system. The term rectangle should be understood very broad in this context and could be understood as the frame having a geometrical shape such as a square, rectangle, trapeze and even a geometrical shape with curved lines.

The invention provides a unique transport system for transporting large items based on a frame with a substantially rectangular shape on which the items are placed on integrated support bars in the frame. Due to the use of rods and through going holes it has been found that it is possible to place and secure the large items on the frame in a manner so no parts of the large items extends beyond the limitations defined by the rectangular frame, although these limitations are not actual physical limitations. Thus, the frame can be designed to have the length and width of a standard freight container, which can easily be loaded on a truck or a container ship. The height of the loaded frame may however be higher than the height of a standard freight container, thereby providing freedom to carry large items. On a container ship the frame can be loaded as top freight, and due to the fact that the frame only occupies the area of a standard container the freight cost may be significantly lower than if the large items were transported in the conventional way where it would occupy the area of two or three standard containers. Because the load on the frame is higher than the height of a standard container the freight cost may e.g. be 1½ time that of the freight cost for a standard container. Furthermore the cost of handling in the shipping and destination harbour is reduced with the invention, as fewer lifts by the harbour crane and personal are needed.

In a preferred embodiment of the transport system the large items are flanges. In particular the large items may be flanges for wind power plants, e.g. for the towers. Such flanges are ring shaped with diameters that typically are in the range of 1 to 8 meters depending on the size of the tower and the location of the flange in the tower. Typically each flange has a height ranging from about 10 cm to about 50 cm.

For the purpose of obtaining a solid attachment of the large items to the frame the first and second rod are preferably connected with the longitudinal beams by chains such as steel chains, wires, ropes or the like, which have a very high strength. The rods are conveniently made from steel or iron or similar material with a sufficient high strength. Each end of the rods may be mounted with fittings that allow the rods to be connected with the chains, wires, ropes or the like, which again can be connected with the longitudinally beams, thereby securing the large items to the frame. The through going holes are preferably substantially parallel with the supporting bars when the large items are placed on the rectangular frame.

However, according to the transport system the large item is equipped with at least three through going holes and preferably a third rod is mounted in the third through going holes of the items. This third rod may also be mounted with fittings that allow the rod to be connected with chains and preferably the third through going hole is located in the upper part of the large item. Thus, the third rod in the third through going hole can be used when the large items is to be lifted. The large items can be lifted together with the frame, e.g. when the large item and the frame are loaded on a truck or a ship, or the third rod in the third through going hole may be used to remove the large items from the frame.

To ensure that the large items remain stable and safe on the frame during transport the large items may comprise further through going holes and one or more of the further through going holes may be mounted with a rod. The end of the rod is equipped with fittings that can lock the large items together.

The beams forming the rectangular frame of the transport is preferably made from steel or iron and welded together or assembled by nuts and bolts. To form a frame that has dimensions in horizontal plane that corresponds to the dimensions of a standard container it is preferred that the length of the longitudinal beams is in the range of about 3 m to about 9 m and the length of the transverse beams is between 1.34 m to 2.44 m.

Although the large items may have a largest extension of above 8 m it is preferred that the large items have a largest extension in the range of about 3 m to 8 m. In this manner it is possible to obtain the best possible utilisation of the transport system according to the invention.

It is also possible to place the transport system according to the invention on a further support which may e.g. be a frame-like structure or a top open container, i.e. a container without a top or roof. The frame and the large items are naturally attached to the further support and in an embodiment the third through going hole and the third rod are used to attach the large items to a further support. This embodiment is particular advantageously when the third through going hole is in the upper part of the large item as the attachment may stabilise the transport system. The attachment may be done by use of chains, wires, ropes or corresponding means.

DESCRIPTION OF THE DRAWINGS

The invention will now be described in further details with reference to drawings where.

The drawings are only illustrative for some embodiments according to the invention. In the drawings the same reference numbers are used for the same parts.

DETAILED DESCRIPTION OF THE INVENTION

Figure 1:
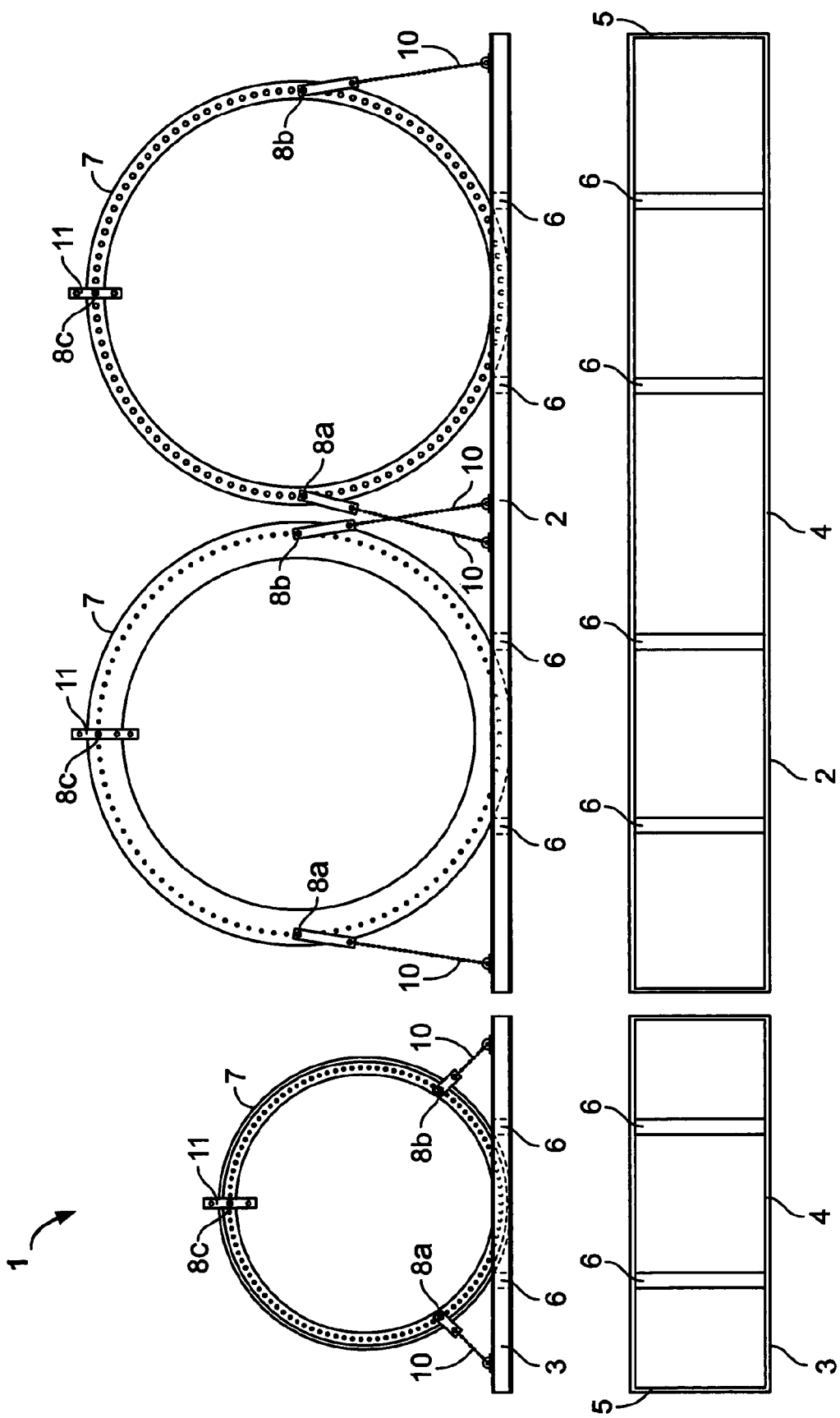
FIG. 1 depicts schematically an embodiment of a transport system according to the invention.

FIG. 1 depicts schematically a transport system 1 according to the invention. Two types of frames are shown, a larger frame 2 and a smaller frame 3. Each frame 2 and 3 is constructed with two longitudinal beams 4 and two transverse beams 5. The beams are assembled to a rectangular structure by welding. According to the invention the transport system also comprises large items, which in this case are flanges 7. The large frame 2 carries two set of flanges and the smaller frame 3 carries one set of flanges. The frames 2 and 3 also comprise transverse support bars 6 to support the flanges 7 that constitute the large items.

The flanges 7 are each equipped with three through going holes 8a, 8b and 8c through and in each hole is mounted a rod 9. The ends of the rods in the holes 8a and 8b are equipped with fittings that allow the rods to be connected with chains 10 that can attach the rods 9 to the frames 2 and 3 and secure the flanges 7 on the frames 2 and 3.

The through going holes 8c are also mounted with a through going rod 9. However, the through going holes 8c are located at the top part of the flanges 7. The end points of these rods can also be mounted with fittings 11 that allow the rods to be connected with hooks and chains, wires, ropes or the like from a crane, whereby it is possible to lift the flanges 7 with or without the frames 2 and 3.

Figure 2:
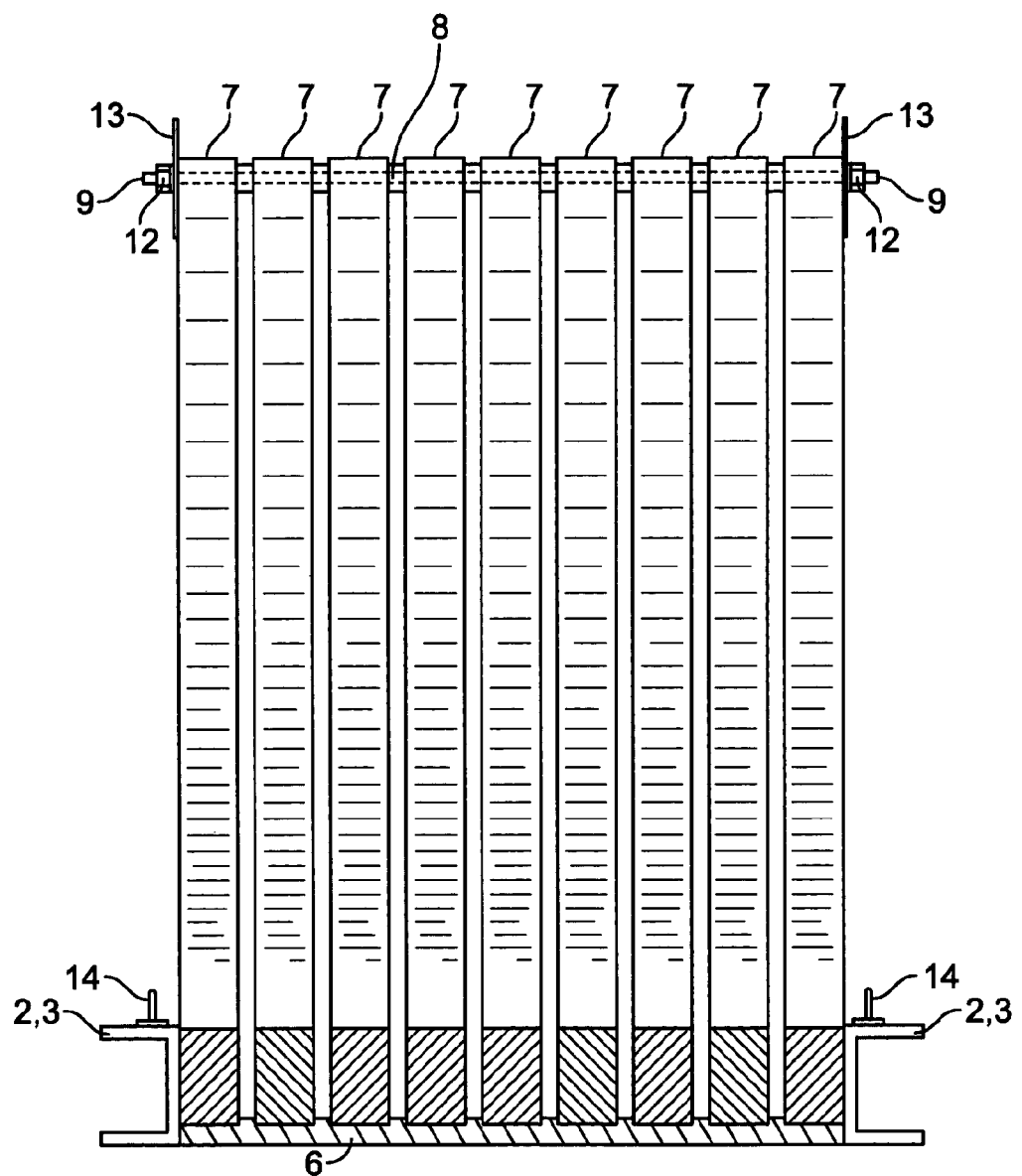
FIG. 2 depicts a cross section of the embodiment of FIG. 1.

FIG. 2 depicts a transverse section of the flanges 7 placed on the frame 2 and the support bars 6. Nine flanges 7 are placed on the frame 2. The rod 9 is seen mounted in the through going hole 8. At the end points of the rod 9 it is equipped with nuts 12 and fittings 13 that are used to secure the flanges 7 to the frame 2.

In FIG. 2 the flanges 7 are mounted on the frame 2, 3 with a spacing between each flange. In these spacing it is possible to insert suitable distance pieces such a pieces of wood or rubber.

The frame 2 may be equipped with further lifting devices 14 that can be used for lifting the frame onto a truck or ship.

Figure 3:
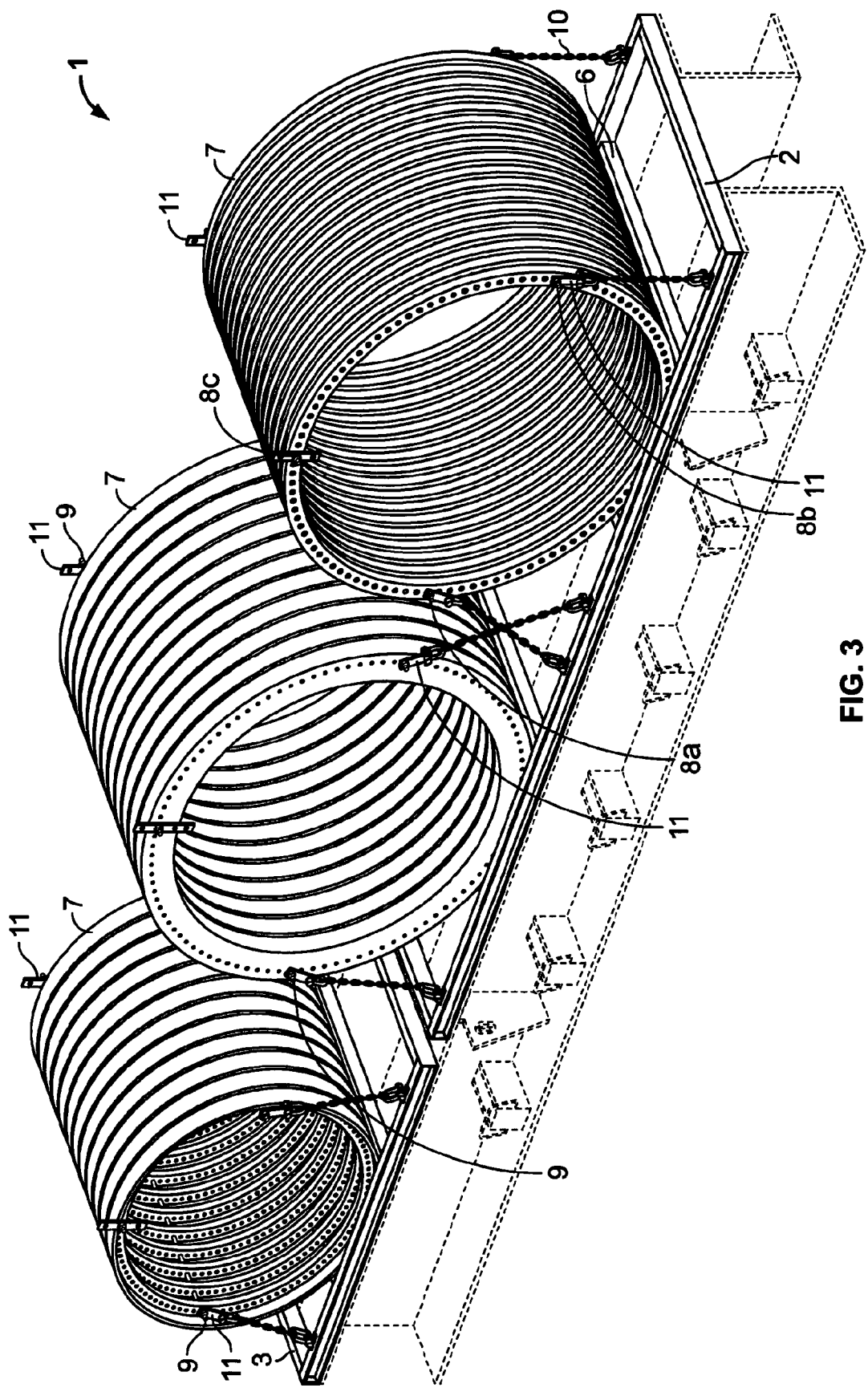
FIG. 3 depicts an embodiment of the transport system according to the invention.

FIG. 3 shows an embodiment of the transport system according to the invention. The system comprises two frames 2 and 3 as described above. The frames comprise transverse support bars 6 which carry the flanges 7 that are transported. The flanges 7 are attached to the frames 2 and 3 by means of rods 9 passing through corresponding holes 8a and 8b in the flanges 7. The rods 9 are mounted with fittings 11 that are connected with chains 10 which attach the flanges 7 to the frames 2 and 3. The flanges 7 have a third hole 8c in which a rod 9 with fittings 11 are mounted. The fittings and rod in the third hole 8c can be used when the flanges 7 are lifted with or without the frames 2 and 3.

FIG. 3 also shows supporting U-profiles (with dotted lines). These supporting U-profiles also comprise means that allow them to be connected with a crane and be lifted by the crane. Thus, in this embodiment it is possible to lift the frames 2 and 3 by lifting the supporting U-profiles.

Although the present invention has been described with reference to only a few embodiments, it will easily be envisaged by a skilled person that several other embodiments and variations are possible within the scope of the claims. The frames may e.g. have a different design and the transport system may be used for other items than flanges.

What is claimed is:

1. A combination comprising:
   a transport system for transporting large items, and the large items;
   wherein the large items each comprise at least three through-going holes; and
   said system comprises
      a frame supporting the items, wherein said frame has a substantially rectangular shape and comprises
         two parallel transverse beams,
         two parallel longitudinal beams connected by the two parallel transverse beams, and
         at least two transverse support bars located between the two parallel transverse beams and supporting the items,
      first and second rods mounted in each of two through-going holes in the items,
   wherein each end of the first and second rods are connected to the longitudinal beams or to the transverse beams and secure the items to the frame such that no parts of the items extend over a rectangle defined by the two parallel longitudinal beams and the two parallel transverse beams.

2. The transport system according to claim 1, wherein the large items are flanges.

3. The transport system according to claim 1, further comprising:
   chains, wires, or ropes connecting the first and second rods with the longitudinal beams.

4. The transport system according to claim 1, further comprising:

a third rod is mounted in the third through-going hole of each of the items.

5. The transport system according to claim 1, wherein the items each comprise additional through-going holes.

6. The transport system according to claim 5, further comprising at least one additional rod, and wherein at least one of the additional through-going holes is mounted with said at least one additional rod.

7. The transport system according to claim 1, wherein the length of the longitudinal beams is in the range of about 3 m to about 9 m.

8. The transport system according to claim 7, wherein the length of the transverse beams is between 1.34 m to 2.44 m.

9. The transport system according to claim 1, wherein the items have a largest dimension in the range of about 3 m to about 8 m.

10. The transport system according to claim 4, wherein the third through going hole and the third rod are configured and arranged to attach the large items to a further support.

11. A method of transporting large items, the large items each having at least three through-going holes, the method comprising:

providing a system including
- a frame configured to support the items, wherein said frame has a substantially rectangular shape and comprises
  - two parallel transverse beams,
  - two parallel longitudinal beams connected by the two parallel transverse beams, and
  - at least two transverse support bars located between the two parallel transverse beams, and
- first and second rods, wherein each end of the first and second rods are connected to the longitudinal beams or to the transverse beams;

positioning the first and second rods in each of two through-going holes in the items;

supporting the items with the transverse support bars of the frame; and securing the items to the frame via said rods such that no parts of the items extend over a rectangle defined by the two parallel longitudinal beams and the two parallel transverse beams.

\* \* \* \* \*